No. 846,948. PATENTED MAR. 12, 1907.
J. RICHTER.
REVOLVING TRAY.
APPLICATION FILED NOV. 19, 1906.
Fig. 1.
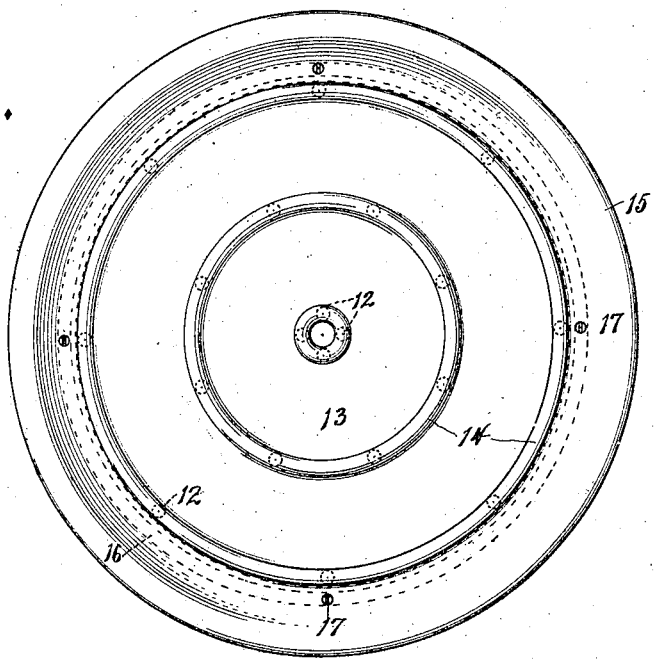
Fig. 2.
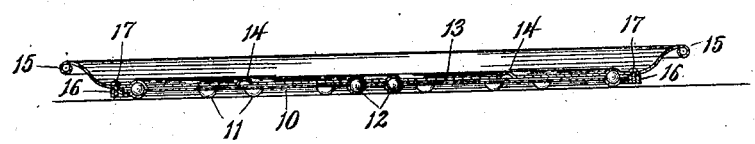
Fig. 4. Fig. 3.
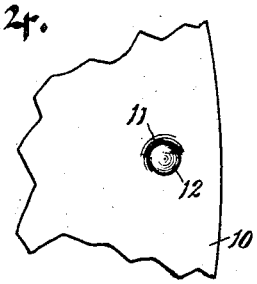 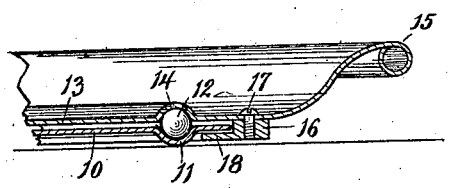
Witnesses. Inventor.
Jacob Richter
By Benedict, Morsell & Caldwell
Attorneys.

UNITED STATES PATENT OFFICE.

JACOB RICHTER, OF MILWAUKEE, WISCONSIN.

REVOLVING TRAY.

No. 846,948.  Specification of Letters Patent.  Patented March 12, 1907.

Application filed November 19, 1906. Serial No. 344,007.

*To all whom it may concern:*

Be it known that I, JACOB RICHTER, residing in Milwaukee, in the county of Milwaukee and State of Wisconsin, have invented new and useful Improvements in Revolving Trays, of which the following is a description, reference being had to the accompanying drawings, which are a part of this specification.

This invention has for its object to provide a tray for table-service which will be capable of turning, so as to present several serving-dishes to all persons seated at a dining-table without the necessity for lifting or passing the serving dishes or tray.

With the above object in view the invention consists in the revolving tray herein claimed, its parts and combinations of parts, and all equivalents.

Referring to the accompanying drawings, in which like characters of reference indicate the same parts in the several views, Figure 1 is a plan view of a revolving tray constructed in accordance with this invention. Fig. 2 is a central sectional view thereof. Fig. 3 is an enlarged view of a fragment of the tray as shown in Fig. 2, and Fig. 4 is a plan view of a fragment of the base-plate with one of the bearing-balls seated in a pocket thereof.

In the drawings, 10 represents a base-plate which is of a disk-like construction, having pockets 11 formed therein in a circle near its periphery, in a circle near its center, and in an intermediate circle. Bearing-balls 12 are seated in the pockets 11 and are free to turn therein without rolling out. A tray member 13 covers the base-plate 10 and is provided with circular grooves 14, corresponding with the circles of ball-pockets in the base-plate and constituting raceways for the balls 12. The tray member 13 is provided with a rolled rim 15 around its periphery to prevent dishes sliding off therefrom, and it is held to the base-plate 10 against removal by means of a ring 16, which is secured to the bottom of the tray member by screws 17 or other suitable means and has an inwardly-extending annular flange 18, spaced from the bottom of the tray member and embracing the periphery of the base-plate 10 therebetween. In this manner the base-plate is held to the tray member and the tray may be moved freely about, as with any other tray, without danger of separating the tray member from the base-plate or of removing the bearing-balls from their pockets 11. By employing the pockets in the base-plate the tray member may be uniformly supported on all sides without the raceways being entirely filled with bearing-balls, the pockets thus serving as ball-spacers for keeping the balls properly spaced apart.

Preferably the pockets 11 and the grooves 14 are impressed into the sheet-metal base-plate and tray member, respectively, as shown in the drawings, and then the projections underneath the base-plate formed by the pockets constitute feet for holding the tray up from the table, and the projections formed by the grooves 14 serve as concentric ridges to hold plates in place on the tray.

In practice the tray is preferably placed in the center of the table with the serving-dishes arranged thereon, and when it is desired to present any serving-dish at any place at the table the tray may be freely turned to accomplish this by grasping the rim 15 and turning the tray member, which will be easy of accomplishment by reason of the ball-bearings beneath.

A feature of considerable advantage in the construction of tray here shown is that the space provided between the tray member and the base-plate and the space formed between the base-plate and the table serve to insulate the table from the heat of the dishes contained in the tray, and thus avoid the injurious effect thereof.

What I claim as my invention is—

1. A revolving tray, comprising a base-plate of sheet metal having pockets pressed therein forming projecting feet beneath the base-plate to rest on a table or the like, bearing-balls seated in the pockets of the base-plate, and a tray member having concentric annular grooves in its bottom to form raceways for the bearing-balls.

2. A revolving tray, comprising a base-plate of sheet metal having pockets pressed therein forming projecting feet beneath the base-plate to rest on a table or the like, bearing-balls seated in the pockets of the base-plate, and a sheet-metal tray member having an annular groove pressed in its bottom surface to form a raceway for the bearing-balls.

3. A revolving tray, comprising a base-plate of sheet metal having pockets pressed therein forming projecting feet beneath the base-plate to rest on a table or the like, bearing-balls seated in the pockets of the base-plate, a sheet-metal tray member having concentric annular grooves pressed in its bottom surface to form raceways for the bearing-balls, and a flange on the tray member engaging the edge of the base-plate to prevent separation of the base-plate and the tray member and to prevent displacement of the bearing-balls.

4. A revolving tray, comprising a base-plate of sheet metal having pockets pressed therein forming projecting feet beneath the base-plate to rest on a table or the like, bearing-balls seated in the pockets of the base-plate, a sheet-metal tray member having concentric annular grooves pressed in its bottom surface to form raceways for the bearing-balls, a rim on the tray member by which it may be turned, and a ring secured to the bottom of the tray member and provided with an inwardly-extending annular flange spaced from the bottom of the tray member and confining the edge of the base-plate therebetween to prevent separation of the base-plate and the tray member and to prevent displacement of the bearing-balls.

In testimony whereof I affix my signature in presence of two witnesses.

JACOB RICHTER.

Witnesses:
R. S. C. CALDWELL,
ANNA F. SCHMIDTBAUER.